US009725187B2

(12) United States Patent
Swearingen et al.

(10) Patent No.: US 9,725,187 B2
(45) Date of Patent: Aug. 8, 2017

(54) VEHICLE HEALTH MANAGEMENT SYSTEMS AND METHODS

(71) Applicant: The Boeing Company, Chicago, IL (US)

(72) Inventors: Kevin Swearingen, St. Charles, MO (US); Kirby J. Keller, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 14/566,558

(22) Filed: Dec. 10, 2014

(65) Prior Publication Data

US 2016/0347470 A1    Dec. 1, 2016

Related U.S. Application Data

(60) Division of application No. 11/761,922, filed on Jun. 12, 2007, now Pat. No. 8,942,882, which is a continuation-in-part of application No. 10/884,553, filed on Jul. 2, 2004, now abandoned.

(51) Int. Cl.
*B64D 45/00* (2006.01)
*G05D 1/08* (2006.01)
*G06N 7/00* (2006.01)
*G07C 5/08* (2006.01)

(52) U.S. Cl.
CPC ........... *B64D 45/00* (2013.01); *G05D 1/0816* (2013.01); *G06N 7/005* (2013.01); *G07C 5/0808* (2013.01); *G07C 5/0816* (2013.01); *B64D 2045/0085* (2013.01)

(58) Field of Classification Search
CPC ............ B60R 16/0232; B60R 16/0234; G07C 5/0808; G07C 5/0816; G07C 5/0841; G08G 1/0129; G08G 1/0969; G08G 1/142; G08G 1/163; B60W 50/14; G01C 21/3461; H04W 74/0816; H04W 76/023; B64D 45/00; B64D 2045/0085; G05D 1/0816; G06N 7/005
USPC .......................................... 701/3, 31.4, 33.9
See application file for complete search history.

(56) References Cited

U.S. PATENT DOCUMENTS

| | | |
|---|---|---|
| 4,215,412 A | 7/1980 | Bernier et al. |
| 5,343,703 A | 9/1994 | Kamimura |
| 5,383,133 A | 1/1995 | Staple |
| 5,550,731 A | 8/1996 | Jackson |

(Continued)

*Primary Examiner* — Nga X Nguyen
(74) *Attorney, Agent, or Firm* — Toler Law Group, PC

(57) ABSTRACT

A method includes receiving first vehicle data from a sensor on a vehicle at one or more processors executing a first software module. The method includes determining a risk value, a confidence value associated with whether the first vehicle data matches a validated vehicle state, and a benefit value associated with providing the first vehicle data to a second software module. The method includes calculating a health score associated with the first vehicle data based on the risk value, the confidence value, and the benefit value. The method includes, in response to the health score meeting a threshold value, determining whether the first vehicle data is internally consistent, externally consistent, and stable over time. The method further includes, in response to the first vehicle data being internally consistent, externally consistent, and stable over time, providing the first vehicle data to a vehicle flight control system.

20 Claims, 11 Drawing Sheets

(56) References Cited

U.S. PATENT DOCUMENTS

| | | | |
|---|---|---|---|
| 5,550,736 A | 8/1996 | Hay et al. | |
| 5,615,119 A | 3/1997 | Vos | |
| 5,638,277 A | 6/1997 | Nagai | |
| 5,806,805 A | 9/1998 | Elbert et al. | |
| 6,014,598 A | 1/2000 | Duyar et al. | |
| 6,128,554 A | 10/2000 | Damotte | |
| 6,349,900 B1 | 2/2002 | Uttley et al. | |
| 6,367,031 B1 | 4/2002 | Yount | |
| 6,532,412 B2 | 3/2003 | Adibhatla et al. | |
| 6,622,972 B2 | 9/2003 | Urnes, Sr. et al. | |
| 6,643,569 B2 | 11/2003 | Miller et al. | |
| 6,646,397 B1 * | 11/2003 | Discenzo | G05B 23/0294 318/139 |
| 6,650,973 B2 | 11/2003 | Yamamoto | |
| 6,694,235 B2 | 2/2004 | Akiyama | |
| 6,738,696 B2 | 5/2004 | Oi | |
| 6,928,345 B2 | 8/2005 | Quinn | |
| 7,017,861 B1 | 3/2006 | Johansson et al. | |
| 7,251,550 B2 | 7/2007 | Eschborn et al. | |
| 7,471,995 B1 * | 12/2008 | Robinson | G01C 23/00 340/901 |
| 2001/0016789 A1 | 8/2001 | Staiger | |
| 2001/0042229 A1 | 11/2001 | James | |
| 2002/0026278 A1 | 2/2002 | Feldman et al. | |
| 2003/0033178 A1 | 2/2003 | Black et al. | |
| 2003/0076221 A1 | 4/2003 | Akiyama et al. | |
| 2003/0120399 A1 | 6/2003 | Yamamoto | |
| 2004/0176885 A1 | 9/2004 | Quinn | |
| 2005/0080593 A1 | 4/2005 | Blaser | |
| 2005/0114090 A1 | 5/2005 | Black et al. | |
| 2005/0256682 A1 | 11/2005 | Galutia et al. | |
| 2005/0267655 A1 | 12/2005 | Gessner | |
| 2005/0273653 A1 | 12/2005 | Zubkow | |
| 2006/0004499 A1 | 1/2006 | Trego et al. | |
| 2006/0020378 A1 | 1/2006 | Salman et al. | |
| 2006/0020379 A1 | 1/2006 | Salman et al. | |
| 2009/0210104 A1 | 8/2009 | Bernard et al. | |

* cited by examiner

VEHICLE HEALTH MANAGEMENT SYSTEMS AND METHODS

CLAIM OF PRIORITY

This application is a divisional of, and claims priority to, U.S. patent application Ser. No. 11/761,922, filed on Jun. 12, 2007, which is a continuation-in-part of U.S. patent application Ser. No. 10/884,553, filed on Jul. 2, 2004, now abandoned, the contents of each of which are incorporated herein by reference in their entirety.

GOVERNMENT LICENSE RIGHTS

This invention was made with Government support under U.S. Government contract F33615-01-2-3152. The Government has certain rights in this invention.

FIELD OF THE DISCLOSURE

This disclosure relates to vehicle health management and more specifically, to vehicle health management systems and methods and their integration with vehicle flight control systems.

BACKGROUND

Aircraft software is typically verified and validated to ensure that it performs reliably and according to its software requirements specification. As aircraft have evolved and become more complex, software verification and validation costs have increased significantly.

One solution to high software verification and validation costs is to segregate the vehicle control software into groups (e.g., flight critical software, mission critical software, and maintenance critical software) and perform a less rigorous or comprehensive verification and validation of the less safety-critical software.

Flight critical (FC) systems typically include the components and software associated with controlling the vehicle, and are the most safety critical vehicle systems. While mission critical (MC) systems typically include the components and software associated with a vehicle's guidance, navigation and health monitoring functions. Although the mission critical systems are important to ensure that the vehicle achieves its mission objectives, they are less safety-critical then the FC systems. Therefore, FC software typically receives a rigorous and comprehensive validation and verification, while MC software receives a less rigorous validation and verification. Because of this difference in verification and validation, the FC and MC systems are partitioned and communication between these software modules is severely limited.

However, both the FC and MC systems monitor and respond to the status and health of the vehicle. The FC system typically monitors a narrow set of gross system and component data such as actuator power thresholds, fuel pump controller power and high-level radar operating status checks. While the MC system typically monitors a more comprehensive and higher fidelity set of system and component data such as actuator power efficiency, radar mode performance and fuel pump outflow pressures. Improved communication between software modules of different criticality levels may therefore provide utility.

BRIEF DESCRIPTION OF THE DRAWINGS

The detailed description is described with reference to the accompanying figures.

SUMMARY

Embodiments of vehicle health management systems and methods are disclosed. Embodiments in accordance with the teachings of the present disclosure may advantageously provide improved health monitoring, and improved capability and performance, in comparison with the prior art.

In one aspect, a vehicle health management system includes a mission critical software module and a flight critical software module. The mission critical software module receives vehicle information, and determines one or more of a risk value, a confidence value or a benefit value based on the vehicle information. The flight critical software module calculates a health score based on one or more of the risk value, the confidence value or benefit value and compares the health score to a threshold value. The flight critical software module filters the vehicle information to determine whether the information is internally consistent, externally consistent or stable over time. The flight critical software module provides the vehicle information to a vehicle flight control system based on the health score and whether the vehicle information is internally consistent, externally consistent or stable over time In another aspect, a method of managing vehicle health information comprising receiving vehicle information by a mission critical software module. The mission critical software module determines a risk value associated with the vehicle information, a confidence value associated with whether the vehicle information matches a validated vehicle state and a benefit value associated with providing the vehicle information to a flight critical software module. The method further includes calculating a health score based on one or more of the risk value, confidence value or benefit value, and filtering the vehicle information to determine if the vehicle information is internally consistent, externally consistent or stable over time. The vehicle information is provided to a flight critical software module based on the health score, and whether the vehicle information is internally consistent, externally consistent or stable over time.

The features, functions, and advantages that have been discussed above or will be discussed below can be achieved independently in various embodiments, or may be combined in yet other embodiments, further details of which can be seen with reference to the following description and drawings.

DETAILED DESCRIPTION

Figure 1:
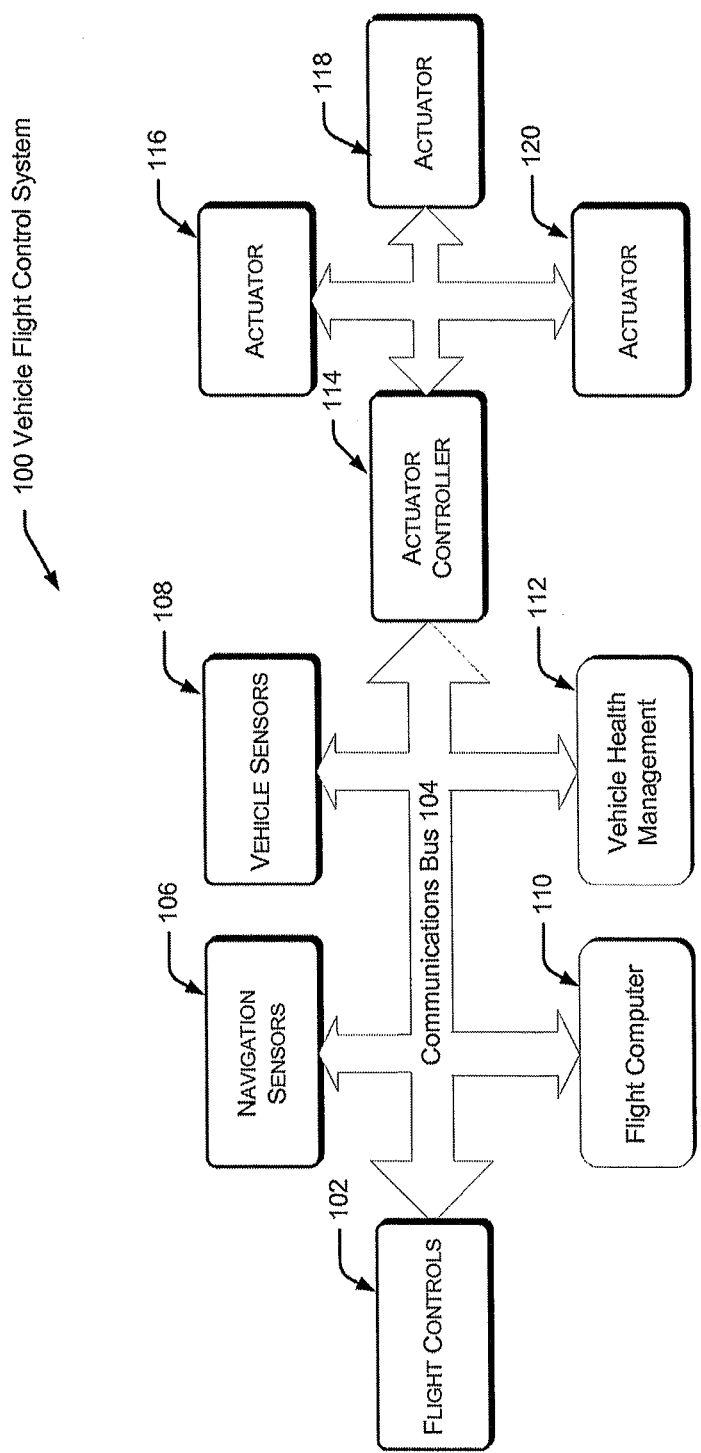
FIG. 1 is a block diagram of an exemplary vehicle flight control system.

FIG. 1 illustrates a flight control system 100 that may be found in military and commercial aircraft, helicopters, pilotless or unmanned aerial vehicles, or other types of aircraft. As shown in FIG. 1, the flight control system 100 includes flight controls 102 for inputting flight commands, a communications bus 104 for communicating with the various components of the flight control system 100, navigation sensors 106 for determining the position and orientation of the vehicle, vehicle sensors 108 for detecting the speed or condition of the vehicle, a flight computer 110 for controlling the vehicle based on inputs from the flight controls 102, a vehicle health management system 112 for monitoring the health of the vehicle, an actuator controller 114 for controlling the vehicle's actuators 116-120 based on commands from the flight computer 110, and actuators 116-120 for actuating and controlling the vehicle's flight control surfaces (not shown).

The flight computer 110 creates or generates command signals based on inputs by a pilot via the flight controls 102, a computer program, a ground controller, or other suitable source of flight control inputs. These command signals are sent via the communications bus 104 to the flight computer 110 which in turn sends one or more commands to the actuator controller 114, which controls the one or more actuators 116-120. The actuators 116-120 receive the one or more commands and respond by moving appropriate flight control surfaces (not shown). The flight control surfaces may include ailerons, flaps, leading edge slats, spoilers, a horizontal stabilizer, elevators, rudders, or other suitable aircraft control effectors. Although only three actuators 116-120 are shown, aircraft typically employ many actuators to control their flight control surfaces and perform other functions.

The vehicle health management system 112 is shown as a separate component and may include a microprocessor, a computer memory and computer software (not shown). Although shown as a separate component or system, the vehicle health management system 112 could be implemented as part of the flight computer 110, as software processed by one or more microprocessors, or other suitable means of implementation.

Figure 2:
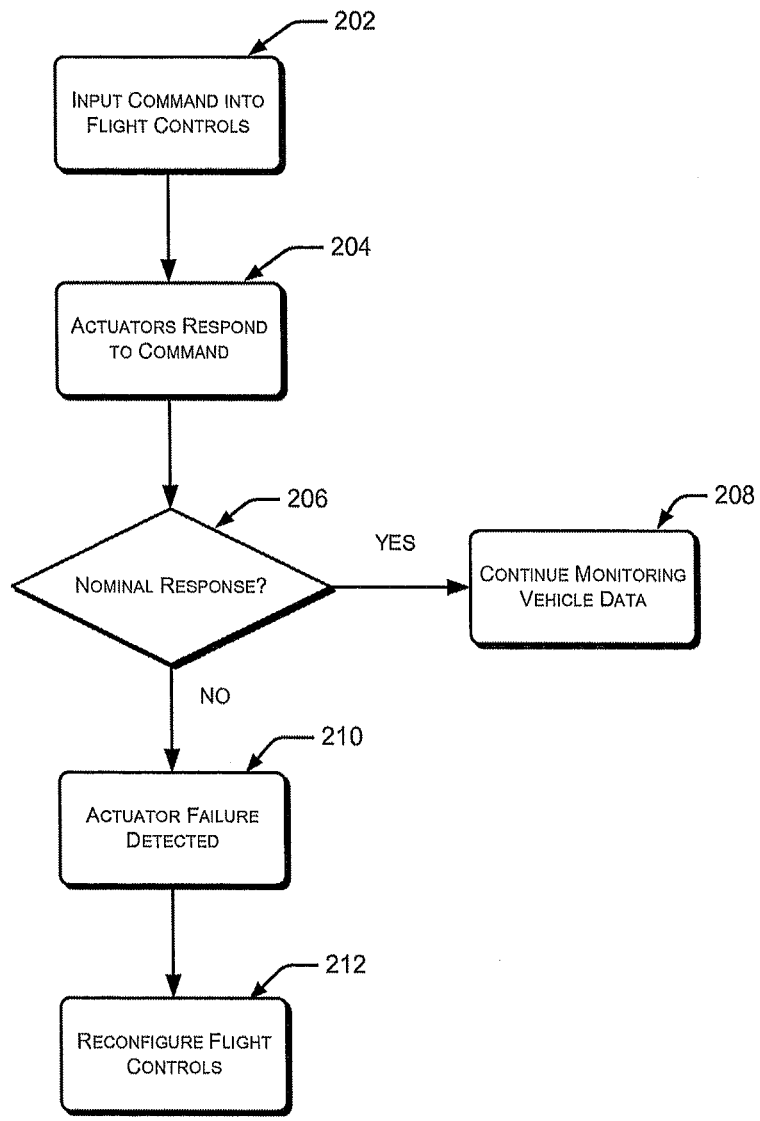
FIG. 2 is a block diagram of a method of detecting an actuator failure and reconfiguring the aircrafts flight controls.

FIG. 2 illustrates a method of detecting an actuator failure and reconfiguring flight controls to compensate for the actuator failure. The method is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the flight control system 100 shown in FIG. 1.

At block 202, a command is input into the flight controls and transmitted via the communications bus 104 to the flight computer 110. The flight computer 110 receives the command and responds by sending a flight computer command to the actuator controller 114. The actuator controller 114 receives the flight computer command from the flight computer 110 and sends one or more corresponding command signals to the actuators 116-120 associated with an appropriate flight control surface, at block 204. For example, the pilot may pull back on the stick to place the aircraft in a gentle climb. The flight computer 110 receives the pilot's input and sends an appropriate command via the communication bus 104 to the actuator controller 114. The actuator controller 114 actuates actuators 116 and 118, which raise the aircraft's left and right elevators.

At block 206, the vehicle health management system 112 monitors commands from the flight computer 110, the navigation sensors 106 (e.g., inertial measurement unit, air speed and altitude sensors) and other vehicle sensors 108 (e.g., actuator position) to detect actuator failure. The vehicle health management system 112 compares the flight computer command with actuator position data to determine whether a nominal response from one or more actuators 116-120 is detected, and if not, a failure is assumed to have occurred. For example, if the actuator position data corresponds to the flight computer command, the one or more actuators 116-120 responded nominally and the vehicle health management system 112 continues to monitor vehicle data (e.g., flight commands, navigation sensors 106 and vehicle sensors 108), at block 208. Conversely, if the flight computer command does not correspond to the actuator's position, an actuator failure has occurred, at block 210. Alternatively (or additionally), the vehicle health management system 112 may compare the aircraft's actual response as measured by the navigation sensors 106 (e.g., aircraft's pitch, roll or yaw sensors) with the vehicle's expected response based on the flight computer command.

If the vehicle health management system 112 detects an actuator failure, at block 210, it may verify the failure by performing a confirmation test. During a confirmation test, the flight computer 110 sends one or more commands to actuate various control surfaces with the intent that they will cancel out one another and produce little or no aircraft motion. Specifically, the flight computer 110 sends commands to a suspect actuator and other actuators such that the aircraft is not expected to change course. However, if the navigation sensors 106 detect that the aircraft is changing course, the actuator failure is confirmed.

Once the vehicle health management system 112 has confirmed the actuator failure, the flight control algorithms are reconfigured to account for the actuator failure, at block 212. Alternatively, the vehicle health management system 112 may implement special commands for functional actuators to compensate for a failed actuator. These special commands may then be sent to the flight computer 110 which sends flight computer commands to the functional actuators.

As previously noted, an aircraft's flight critical (FC) systems typically include components and software associated with controlling the vehicle and are generally the most safety critical aircraft systems. The aircraft's mission critical (MC) systems include components and software associated with a vehicle's guidance, navigation and health monitoring functions and are generally less safety critical. Therefore, the aircraft's FC software typically receives a rigorous and comprehensive validation and verification, while the MC software receives a less rigorous validation and verification. Because of this difference in verification and validation, the FC and MC systems in accordance with the prior art are partitioned and communication between the software modules is severely limited.

Figure 3:
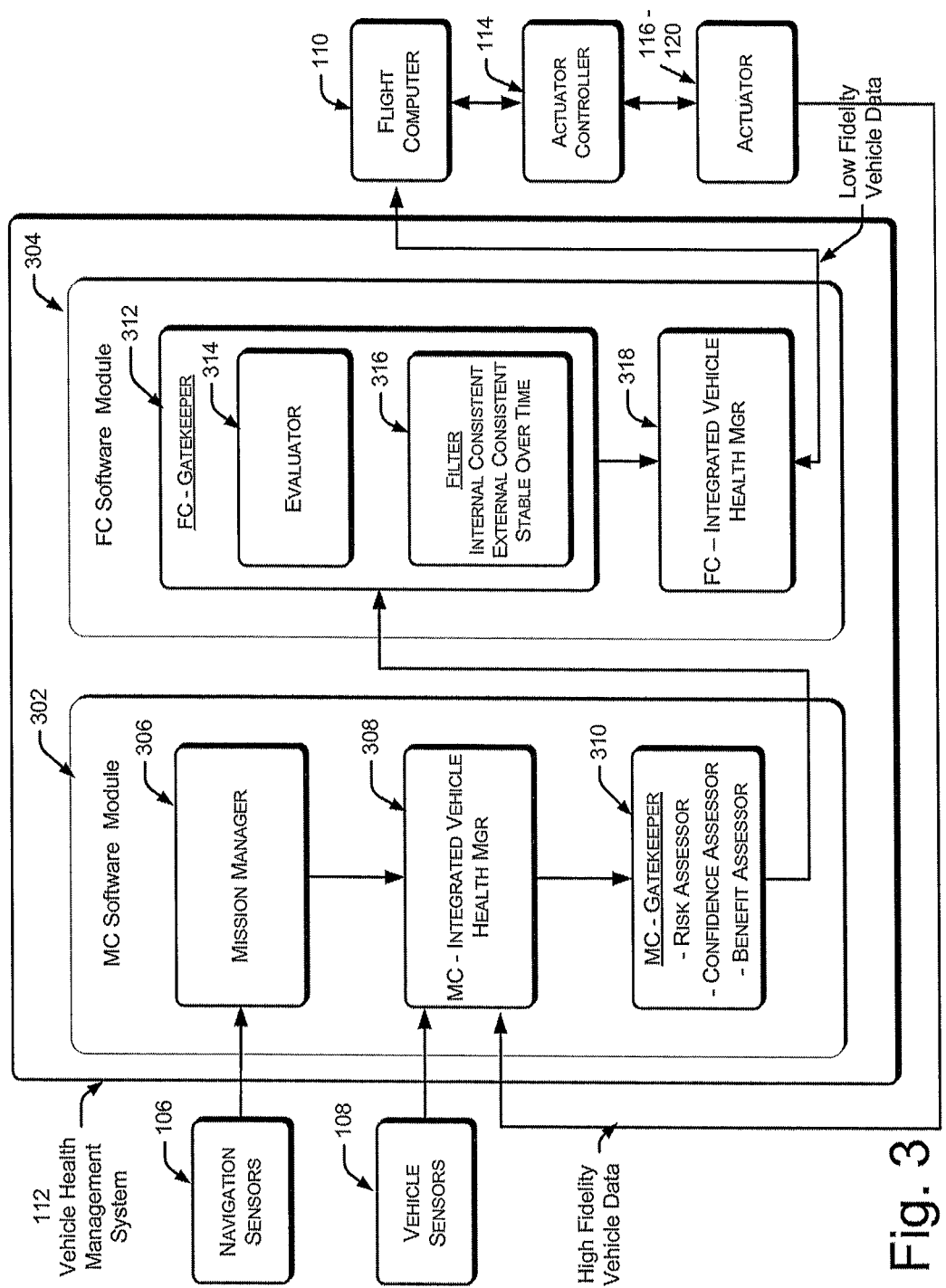
FIG. 3 is a block diagram of a vehicle health monitoring system in accordance with an embodiment.

FIG. 3 illustrates a vehicle health management system 112 in accordance with the teachings of the present disclosure. The vehicle health management system 112 includes a mission critical (MC) software module 302 and a flight critical (FC) software module 304.

The MC software module 302 monitors and responds to state and health of the vehicle. A mission manager 306 receives vehicle state information from the navigation sensors 106 and the vehicle's guidance system (not shown). The vehicle state information may include, for example, vehicle position, orientation, and velocities (e.g. up to six degrees of freedom). A mission critical integrated vehicle health manager (MC-IVHM) 308 receives the vehicle state information from the mission manager 306, vehicle sensors 108, and actuators 116-120. The vehicle state information may include actuator positions, temperatures, and current draw. Based on this information, the MC-IVHM 308 determines whether a component has failed or predicts whether a component will fail in the future.

As noted earlier, the mission critical software undergoes a less rigorous verification and validation than the flight critical software and communication between the software modules is limited. Therefore, determination or prediction of a component failure made by the MC-IVHM 308 is verified by one or more gatekeepers 310-316 before the information is passed to a flight critical integrated vehicle health manager (FC-IVHM) 318 and acted upon by the flight control system 100.

A MC gatekeeper 310 receives the vehicle state information, sensor data and high fidelity component data from the MC-IVHM 308 and calculates: 1) a risk value associated with operating the vehicle under the vehicle's current health state, 2) the benefit associated with reconfiguring the flight controls based on the vehicles health state (e.g., increased vehicle safety or capability) and 3) a confidence value based on how closely the vehicle's current state matches a validated (tested) vehicle state.

The risk value may be calculated based on a component failure modes and effects analysis (FMEA), which determines the impact to vehicle performance resulting from a degraded component. For example, a single motor failure in an actuator equipped with redundant motors is inherently lower risk than a motor failure of an actuator with a single motor. The risk value may also be sensitive to actuator usage (e.g., actuators that are used infrequently typically have a lower effect on vehicle performance than actuators that are used frequently). Moreover, the risk value may also be sensitive to criticality of the control surface being actuated or function being performed since some actuators perform functions that are more critical than others.

The benefit value indicates whether there is an increase in vehicle capability or safety by reconfiguring the flight controls based on the vehicle's current health state. For example, a high actuator temperature may indicate degradation in actuator performance, and an impending actuator failure. By reducing the actuator's usage, the actuator's life may be prolonged and the failure avoided.

The confidence value is based on a comparison of the vehicle's current state and the vehicle's health state when the mission critical software was verified and validated (i.e., tested). Similarities between the two vehicle states increase the confidence that the MC software module 302 is producing a valid result. Conversely, a large difference between vehicle states reduces the confidence that the MC software module 302 is producing a valid result. For example, an actuator may be tested at different loads, temperatures, positions and actuation rates. If a suspect actuator was verified and validated at its current health state there is a high confidence that the output from the MC software module 302 is valid.

Figure 4:
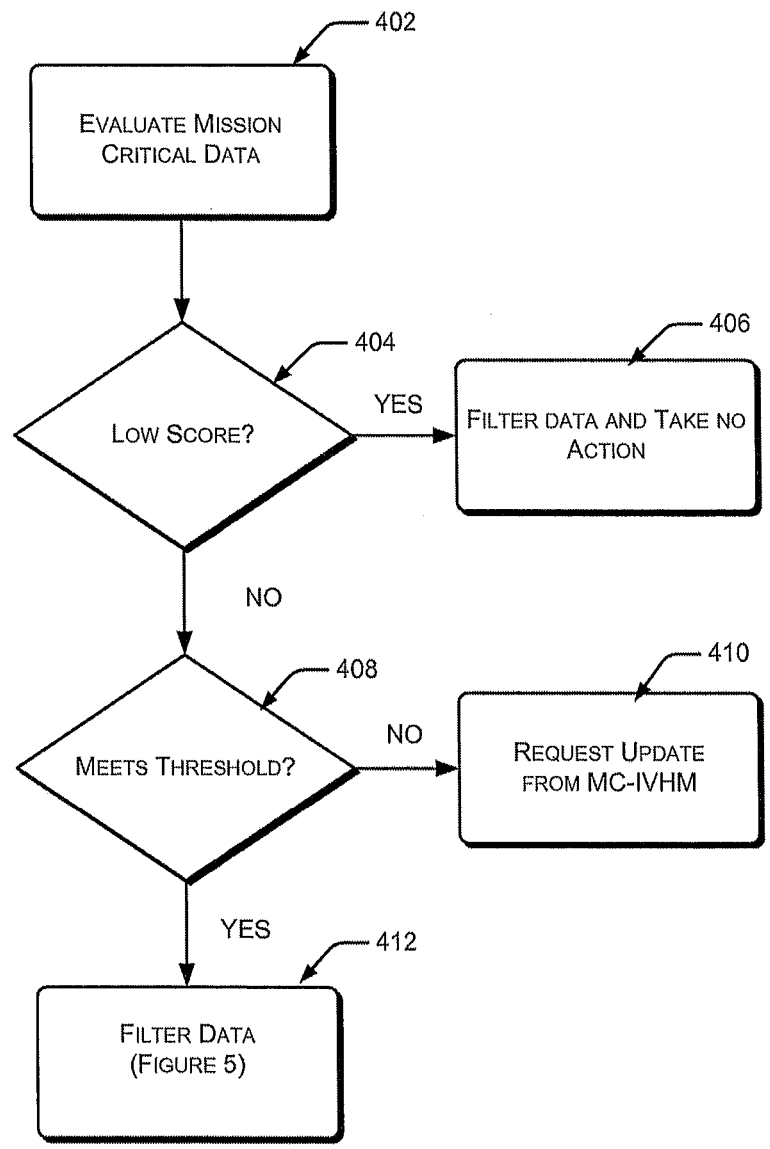
FIG. 4 is a block diagram of a method of evaluating vehicle information in accordance with another embodiment.

FIG. 4 is a block diagram of a method of evaluating vehicle information using the system shown in FIG. 3. In this embodiment, at block 402, the MC gatekeeper 310 sends risk, benefit and confidence values to the FC software module 304. The evaluator 314, based on the risk, benefit and confidence values, calculates a health score using Equation (1) below.

$$Y_i = e_{Ri}X_R + e_{Ci}X_C + e_{Bi}X_B \quad (1)$$

In this equation, Y is the health score, the X's are the risk, confidence, and benefit values, respectively, and the e's are the scale factors associated with the risk, confidence and benefit values.

At block 404, the health score (Y) is screened to determine whether the health score is valid. If the health score is extremely low, which may indicate that the score is invalid, the vehicle data is filtered and the FC software module 304 does not take any further action, at block 406. However, if the health score is not an extremely low score, which may indicate that the health score is valid, it is compared with a threshold value, at block 408. If the health score does not meet the threshold value, the evaluator 314 requests that the MC-IVHM 308 provide updated vehicle data, at block 410. Alternatively, if the health score meets or exceeds the threshold value, the vehicle data is transferred to the filter 316, at block 412.

Figure 5:
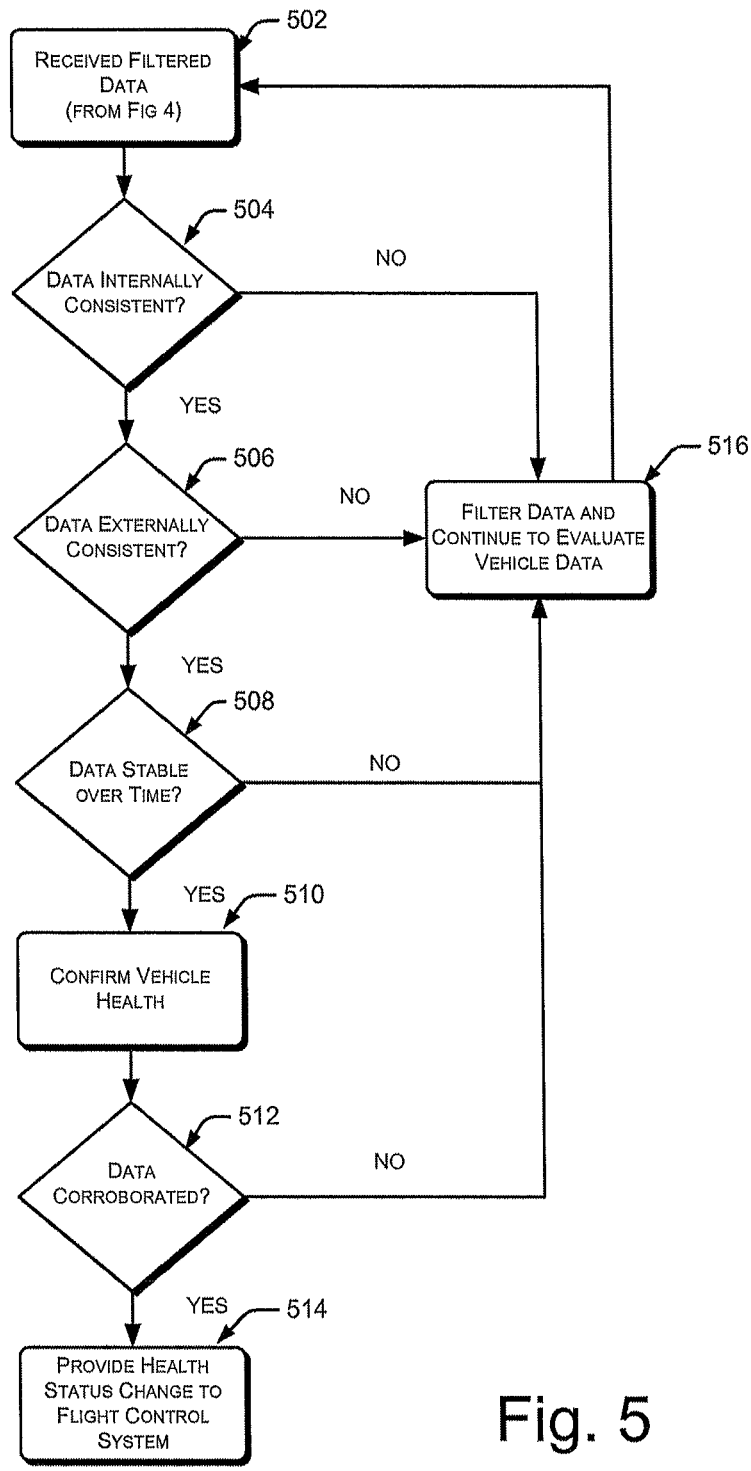
FIG. 5 is a block diagram of a method of filtering vehicle data in accordance with a further embodiment.

FIG. 5 shows an embodiment of a method of filtering vehicle data using the filter 316. Referring to FIG. 5, in this embodiment, the filter 316 evaluates the vehicle data to determine whether it is internally consistent, externally consistent, and stable over time. More specifically, at block 502, the filter 316 receives the vehicle data if the health score meets the threshold value.

At block 504, the filter 316 determines whether the vehicle data is internally consistent by confirming that the data fields are fully populated with values and the values are reasonable. For example, if the measurement is an analog measurement (e.g., actuator temperature measurement) and the data is presented in a digital format, the data is not internally consistent. If the data is internally consistent, the filter 316 then determines whether the data is externally consistent, at block 506. Alternatively, if the data is not internally consistent, the data is filtered and the FC software module 304 continues to evaluate the vehicle data, at block 516. The method then returns to block 502 to continue checking whether the data is internally consistent.

At block 506, the filter 316 then determines whether the high fidelity vehicle data is externally consistent. Since the MC software module 302 and the FC software module 304 operate based on the same vehicle data, their results should be consistent. For example, if the vehicle data includes the position of an actuator, the MC software module 302 would receive high fidelity actuator data (e.g., actuator's actual position) while the FC software module 304 would receive low fidelity actuator data (e.g., an error message indicating the actuator was in the wrong position). Since both software modules are sensing the same actuator, the MC software module data should be externally consistent with the FC software module data. If the MC software module data is determined to be externally consistent at block 506, the vehicle data is then evaluated to determine whether it is stable over time, at block 508. Alternatively, if the MC software module data is externally inconsistent, the data is filtered and the FC software module 304 continues to evaluate the vehicle data, at block 516, and returns to block 504 to re-verify the consistency checks.

At block 508, the filter 316 then determines whether the vehicle data is consistent over time. For an actuator, the filter 316 looks at the actuator's data over a period of seconds or microseconds to determine whether the data has changed unexpectedly. For example, an actuator's temperature is generally stable over short periods of time (e.g., several minutes to a few hours). Therefore, if an actuator's temperature is fluctuating or changing rapidly, the measurement is probably erroneous. Alternatively, an aircraft's landing gear maybe evaluated over several missions which could correspond to several hours or days. If the high fidelity vehicle health data is stable over time, the FC-IVHM 318 evaluates the data, at block 510. Alternatively, if the high fidelity vehicle health data is inconsistent over time, the data is filtered and the FC gatekeeper 312 continues to evaluate the vehicle data, at block 516, and returns to block 504 to re-verify the consistency checks.

At block 510, the FC-IVHM 318 analyzes the data from the various vehicle components to assess their health. For example, the FC-IVHM 318 may analyze an actuator's temperature curves, current draw profiles and position data to determine the actuator's health. Specifically, the FC-IVHM 318 may compare the actuator's current draw vs. load curves with actuator failure mode data to predict when the actuator will fail. At block 512, the FC-IVHM 318 may verify the health of a vehicle component by performing a neural net correction factor test and/or parameter identification (PID) test.

During a neural net correction factor test, the flight control system 100 incorporates neural net correction factors into the flight control algorithms to compensate for unexpected vehicle responses (e.g., degradation of an actuator). The neural network software, residing in the flight computer 110, outputs a correction factor in the form of a vector representing pitch, roll, and yaw. The vector is nominally zero or near-zero, and increases with the need for greater vehicle correction. For example, if a command intended to provide a 20 degree bank angle is received, and the aircraft responds with a 15 degree bank angle, a 5 degree correction factor is added to the vehicle's flight control algorithm. One or more correction factors are evidence that vehicle's performance has degraded.

The FC-IVHM 318 may also perform a parameter identification (PID) test to determine the vehicle's response to each actuator command. The vehicle's actual response is compared to the vehicle's expected response as predicted by a vehicle model. Any divergence between the vehicles actual and predicted responses are attributed to a specific control surface. For example, to isolate a specific control surface actuator, artificial excitations (e.g., small sinusoidal signals) are added to the position command for the specific actuator. Alternatively, the PID test could be performed when the control surface actuator is responding to a specific command (e.g., 10 degrees left rudder).

Once the FC-IVHM 318 has verified the health of the component by performing a neural net correction factor and/or PID test, a correction based on the vehicle data is provided to the flight control system 100, at block 512. If an actuator has a total failure, the flight control system 100 is reconfigured to remove or isolate the actuator. However, if actuator performance has simply degraded, the flight control system 100 may compensate for reduced capability by implementing a neural net correction factor or ramped capability reduction. A ramped capability reduction is performed by modifying the commands sent to the actuator to reduce the stress on the actuator (e.g., moving the actuator slowly from one position to another position versus moving the actuator abruptly or rapidly from one position to another).

Figure 6:
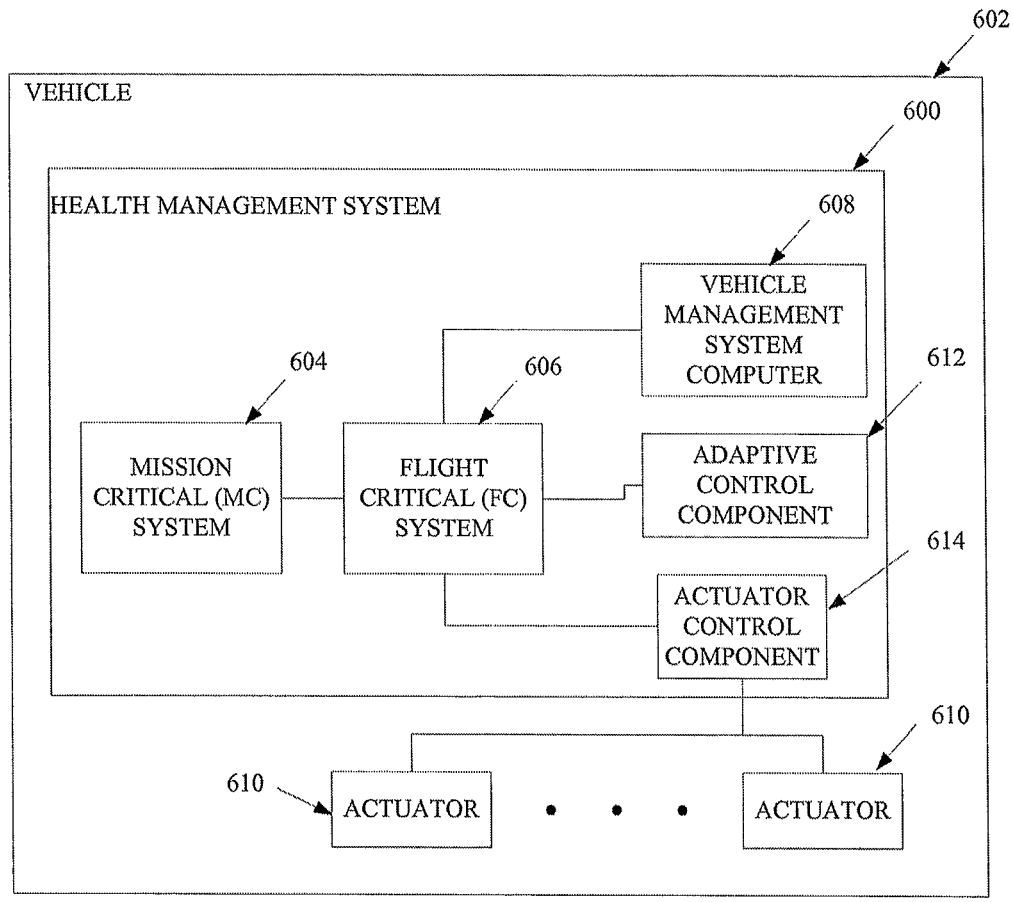
FIG. 6 illustrates a block diagram of an example vehicle and corresponding health management system formed in accordance with another embodiment.

It will be appreciated that a variety of systems and methods for monitoring and managing vehicle health may be conceived, and that the disclosure is not limited to the particular exemplary embodiments described above with reference to FIGS. 1-5. For example, FIG. 6 illustrates exemplary components of a health management system 600 in accordance with another embodiment. Vehicle 602 may be a land vehicle, a subsurface (or submersible) vehicle, an air vehicle, or any other vehicle that has a need to assess the health of actuators that control movement of control surfaces.

In this embodiment, the health management system 600 includes a mission critical (MC) system 604 and a control or flight critical (FC) system 606. The FC system 606 is in data communication with a vehicle management system 608, actuators 610, and an adaptive control (AC) component 612. In one embodiment, the MC system 604 and the FC system 606 are separate computer-based systems that include corresponding verified and validated MC and FC software applications. In the aviation community, verification and validation of FC software is typically more rigorous and complex than verification and validation for MC software, as mandated by the Department of Defense and/or the Federal Aviation Administration. The health management system 600 may include software of such a nature that verification and validation would be prohibitively expensive or impossible to complete to a Flight Critical level. Prior to use, the MC software is validated and verified for a smaller subset of states.

The vehicle management system 608 sends various vehicle status information to the FC system 606. In one embodiment, example vehicle status information includes angle of attack, altitude, pitch, and air speed in the case where the vehicle is an aircraft. Other vehicle data may be retrieved by the vehicle management system 608 and delivered to the FC system 606 depending upon previous requirements or uses for the retrieved information. The AC component 612 retrieves information about each of the actuators 610 and sends that information to the FC system 606. The AC component 612 generates an error signal, such as an adaptive control correction factor (e.g., neural network correction factor), to the FC system 66.

The Adaptive Control flight control system can include neural nets that adapt to any unexpected vehicle response. The correction factor output which can be generated by neural network software is a vector representing pitch, roll, and yaw. The vector is nominally zero or near-zero, and increases with the need for additional correction. The values of additional corrections are called adaptive control or neural net correction factors. These correction factors are provided to the FC system 606 as additional evidence that aircraft performance has degraded. The FC system 606 characterizes the correction factors as nominal or off-nominal. Off-nominal correction factors can be used by FC system 606 to initiate test injection, and by MC system 604 to validate information.

The FC system 606 sends the data and information received from the vehicle management system 608, the actuator control component 614, and the AC component 612 to the MC system 604. The MC system 604 determines the health state for each of the actuators 610 based on the received data and information. The health state information is sent to the FC system 606. The FC system 606 evaluates the health state information of each of the actuators 610 and determines if adjustment of actuator control signals is necessary based on the evaluations. This is described in more detail below with reference to FIGS. 7-10.

Figure 7:
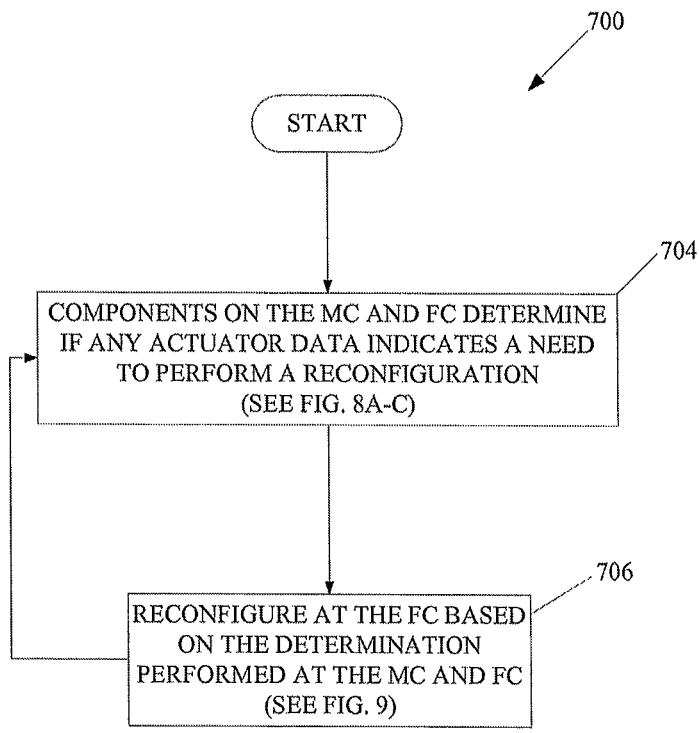
FIGS. 7-10 illustrate an exemplary process performed by the system shown in FIG. 6 for providing adaptive, responsive health management of a vehicle integrated with flight control laws.

FIG. 7 illustrates a process 700 performed by the health management system 600 of FIG. 6. The process 700 is performed by software components of the MC system 604 and of the FC systems 606 that act as a gatekeeper between MC and FC software components of an Integrated Vehicle Health Management (IVHM) System. In an embodiment, the MC system 604 and the FC system 606 include software that performs IVHM system functions and the process 700.

The process 700 begins at block 704, where software components of the MC system 604 and the FC system 606 determine if any actuator data indicates a need to perform a reconfiguration. This process is described in more detail below in FIGS. 8A and 8B. At block 706, reconfiguration is performed based on a determination made at block 704. After reconfiguration occurs at block 706, the process 700 is repeated as necessary. Reconfiguration as shown at block 706 is described in more detail below with regard to FIG. 9.

Figure 8A:
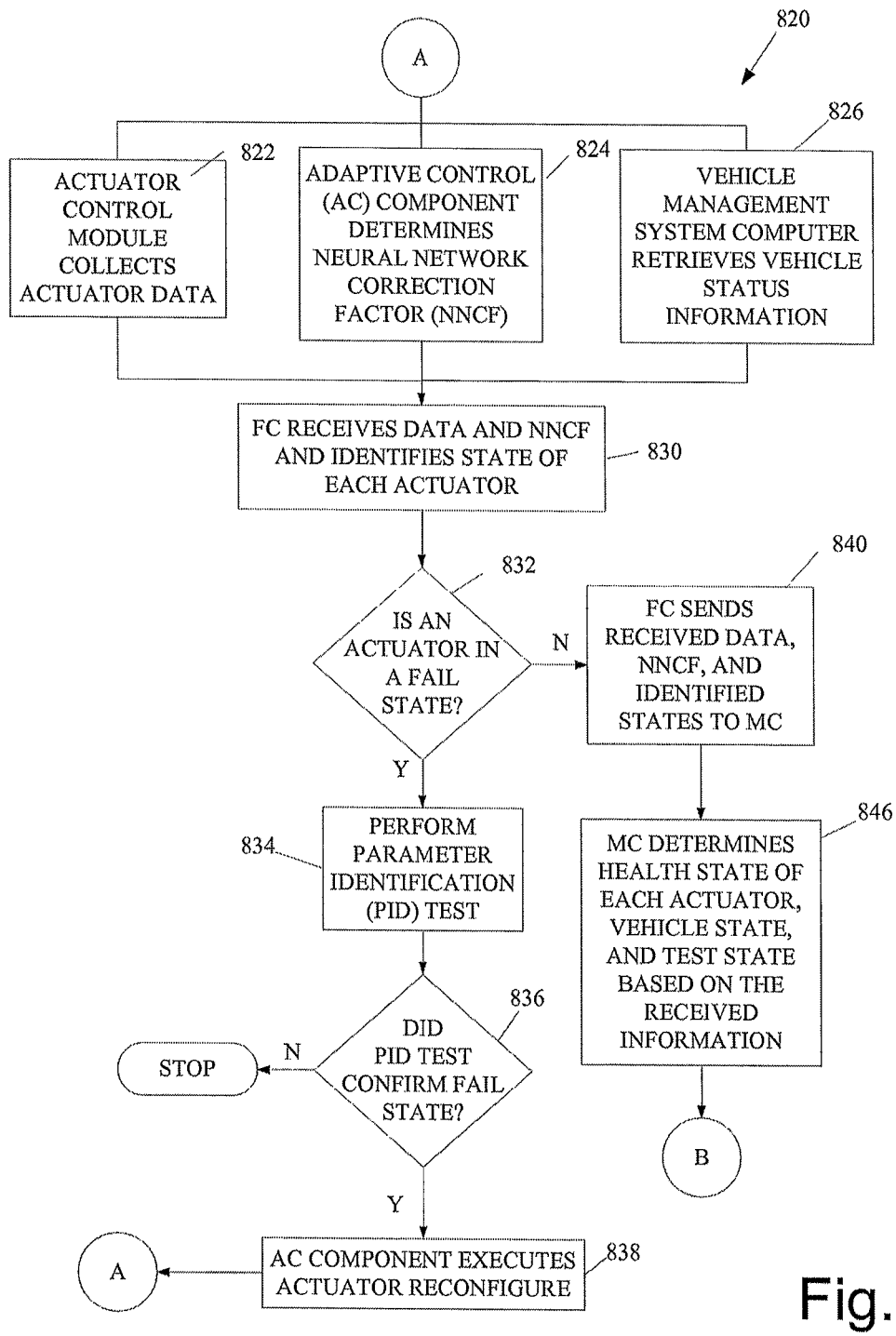

FIG. 8A illustrates a process 820 performed by the health management system 600 for performing the determination made at block 704 of FIG. 7. At block 822, the actuator control component 614 collects data regarding the actuators 610. At block 824, an adaptive control (AC) component determines an adaptive control correction factor (ACCF). At block 826, the vehicle management system 608 retrieves vehicle status information. The data retrieved or determined at blocks 822-826 is sent to the FC system 606. The FC system 606 identifies the state of each of the actuators 610 based on the received data, at block 830.

At block 832, the FC system 606 determines if an actuator is in a fail state. If an actuator is determined to be in a fail state, the FC system 606 performs a parameter identification (PID) test, at block 834. If it is determined at block 836 that the PID test confirms the fail state of an actuator, then, at block 838, the AC component 612 executes actuator reconfiguration. In other words, the FC system 606 redefines limits to flight critical inputs based on the determined failed actuator and sends actuator control instructions according to the redefined limits. If the PID test failed to confirm the previously identified fail state of the actuator at block 836, then the process 820 stops. If there are no actuators 610 in a fail state at block 836, the process 820 continues to block 840, where the FC system 606 sends the information and data received at block 830 to the MC system 604.

Figure 8B:
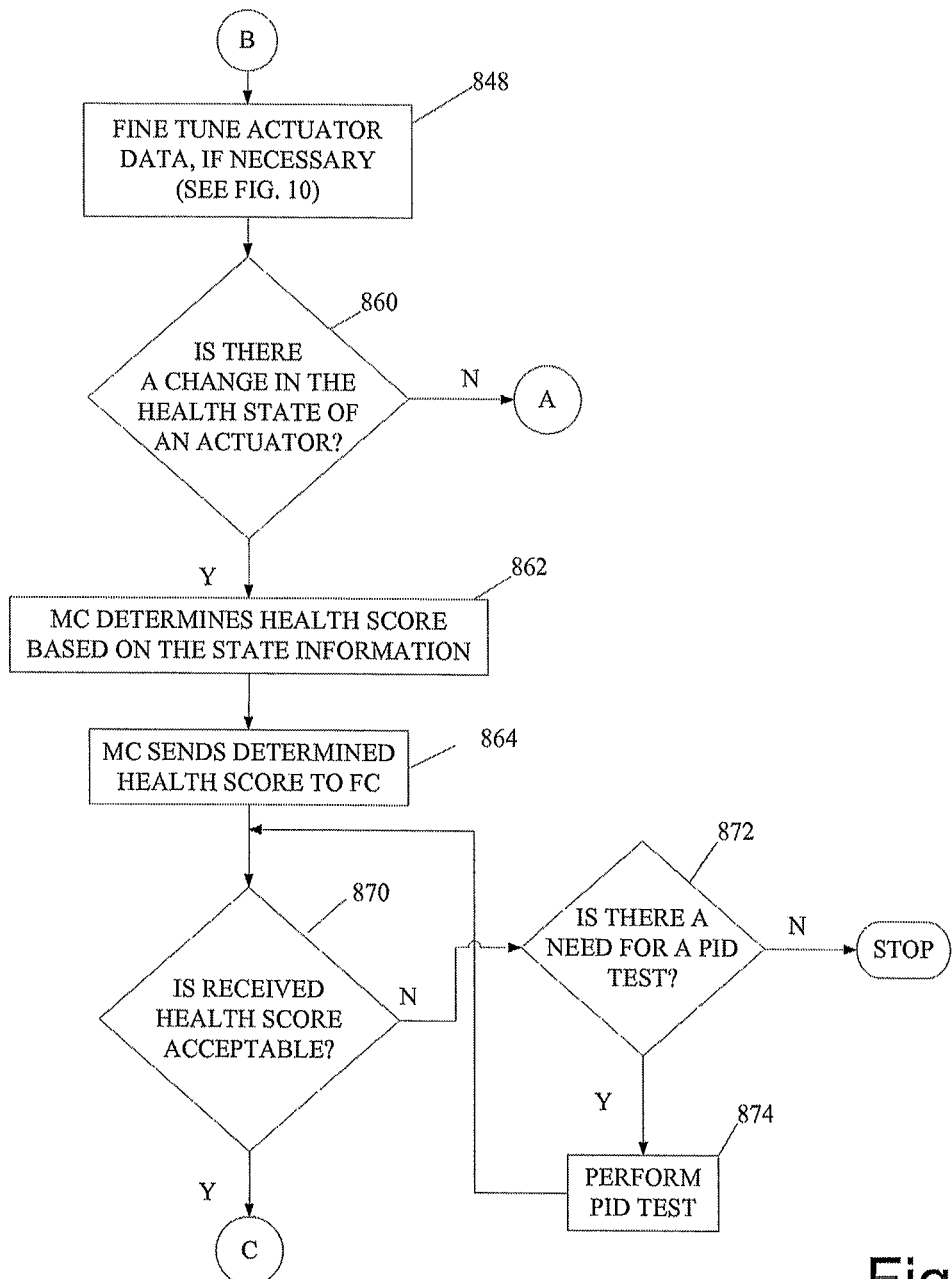

Referring now to FIG. 8B, after the MC system 604 receives the data and information from the FC system 606, then, at block 846, the MC system 604 determines a health state for each actuator 610, a vehicle state, and a test state based on the information.

In some embodiments, the MC IVHAM system may be most effective at determining the health of the actuators when the actuators are commanded with pre-defined sequences of commands, for example a low-frequency sine wave pattern. The vehicle may not be in a state conducive to injecting this test signal. The test state combines the need for such a test, permission to perform the test, and the detailed parameters of the requested test. At block 848, the MC system 604 and FC system 606 fine tune the data related to any actuator 610, if it is determined to be necessary. Fine tuning of actuator data is described in more detail below with regard to FIG. 10.

Next, at block 860, the MC system 604 determines if there is a change in the health state of an actuator that would possibly require a reconfiguration to occur. If the result of block 860 is that there is not a significant change in the health state of an actuator, the process 820 returns to the beginning. If it is determined at block 860 that there is a change in the health state of an actuator 610, then at block 862, the MC system 604 determines a health score based on determined state information. In one embodiment, the health score includes a risk component $X_R$, a confidence component $X_C$, and a benefit component $X_B$.

The risk component is based on failure modes and effects analysis, and captures impact to performance of degraded states. For example, in an actuator with redundant motors, a single motor failure is inherently lower risk (to continued controlled flight) than a controller failure that may render an actuator inoperative. The risk evaluation is sensitive to current vehicle state, in that relatively low demand makes degraded performance less critical. Since some actuators drive control effectors that are more critical than others to maneuvering, the risk assessment is sensitive to the specific instantiation of the actuator component as well.

The benefit component is based on whether there is any previously quantified increase in vehicle capability or safety that would occur with an improvement made to any actuator control signals produced by the health management system 600. Specific health state information regarding the amount of performance degradation allows control reconfiguration. Reconfiguration improves efficiency and performance. For example, high temperatures are known to indicate degraded performance, and lead to catastrophic failure. Reduced usage of a surface prolongs usable life, allows cooling and may avoid failure. The benefit component is dependent on vehicle state, since extended usable life, capability maximization, and safety may not be priorities under certain conditions.

The confidence component is based on comparison of the current state of the actuators and aircraft to the conditions under which the software was verified and validated (V&V) prior to installation. Any similarity increases confidence that the software is producing valid accurate output, while a large difference between the current condition and any tested condition decreases the confidence that the software is producing valid output. The V&V conditions are captured in a table that the confidence component accesses. For actuators, critical test parameters typically include load, temperature, position, velocity, and acceleration.

At block 864, the MC system 604 sends the health score, the test state, and the health state to the FC system 606. At block 870, the FC system 606 determines if the received health score is acceptable for the purposes of performing a reconfiguration, using Equation (1) above (i.e. $Y_i = e_{Ri} X_R + e_{Ci} X_C + e_{Bi} X_B$), and Equation (2) below:

$$\text{Is } Y_i > T_i \text{, where } T_i \text{ is a threshold for a particular actuator} \qquad (2)$$

If the received health score does not exceed the threshold value, the information is not provided to the FC system 606, and the information that was rejected is returned to the MC system 604. If the health score surpasses the threshold value, the inherent value of the information has been deemed to warrant its use for FC system 606, even though its source is the lower confidence MC system. Even so, confirmation is required under certain circumstances.

The filter component includes a set of FC system 606 assets that may be able to confirm information from MC system 604. These assets include Parameter Identification (PID), the ACCF, and the FC system sensors and electronics. Based on vehicle state, health state, and test state, the filter element may invoke any combination of these assets. For instance, the MC system 604 may report a slight rate limitation in a single actuator. Even though it is relatively benign and useful to reconfigure as a result, if the vehicle is in a benign state (i.e. straight and level flight) it may increase confidence that the identified state is accurate if a PID test is run.

If it is determined, at block 872, that there is a need for a PID test, then the FC system 606 performs a PID test at block 874, and returns to block 870 after the test is complete. In some embodiments, the PID test is a test appropriate for the indicated degradation and vehicle state. For example, the PID test may inject a very short sharp perturbation (or "wiggle") onto each control surface and monitor the response of the vehicle. It is relatively straightforward to compare the vibrational modes received to the expected values and identify an anomalous response. This confirmation allows the filter component to pass the MC system information, as illustrated in the process 978 of FIG. 9.

Figure 9:
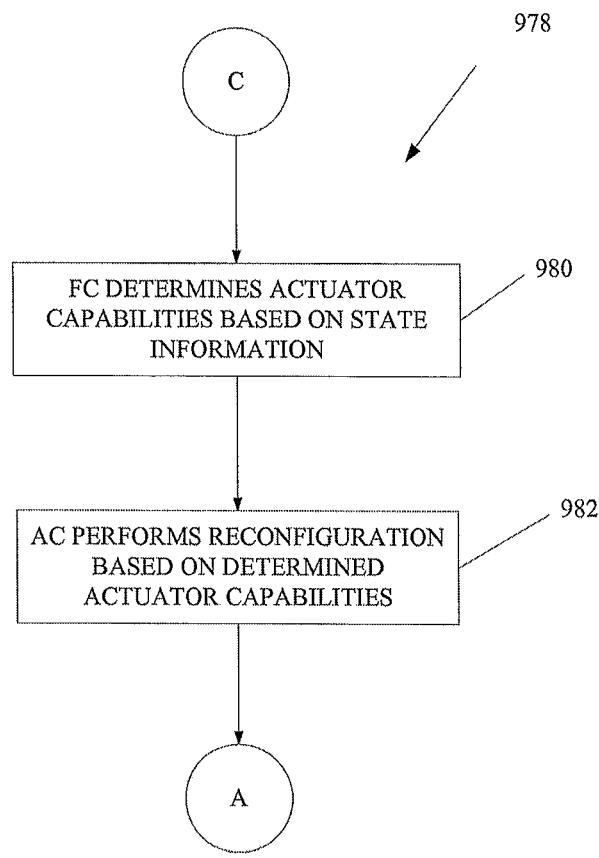

As shown in FIG. 9, at block 980, the filter component determines actuator capabilities based on received state information. At block 982, the AC component 612 performs reconfiguration based on determined actuator capabilities. After reconfiguration, the process 978 returns to the beginning for continued analysis of actuators 610 and any further necessary reconfiguration.

Figure 10:
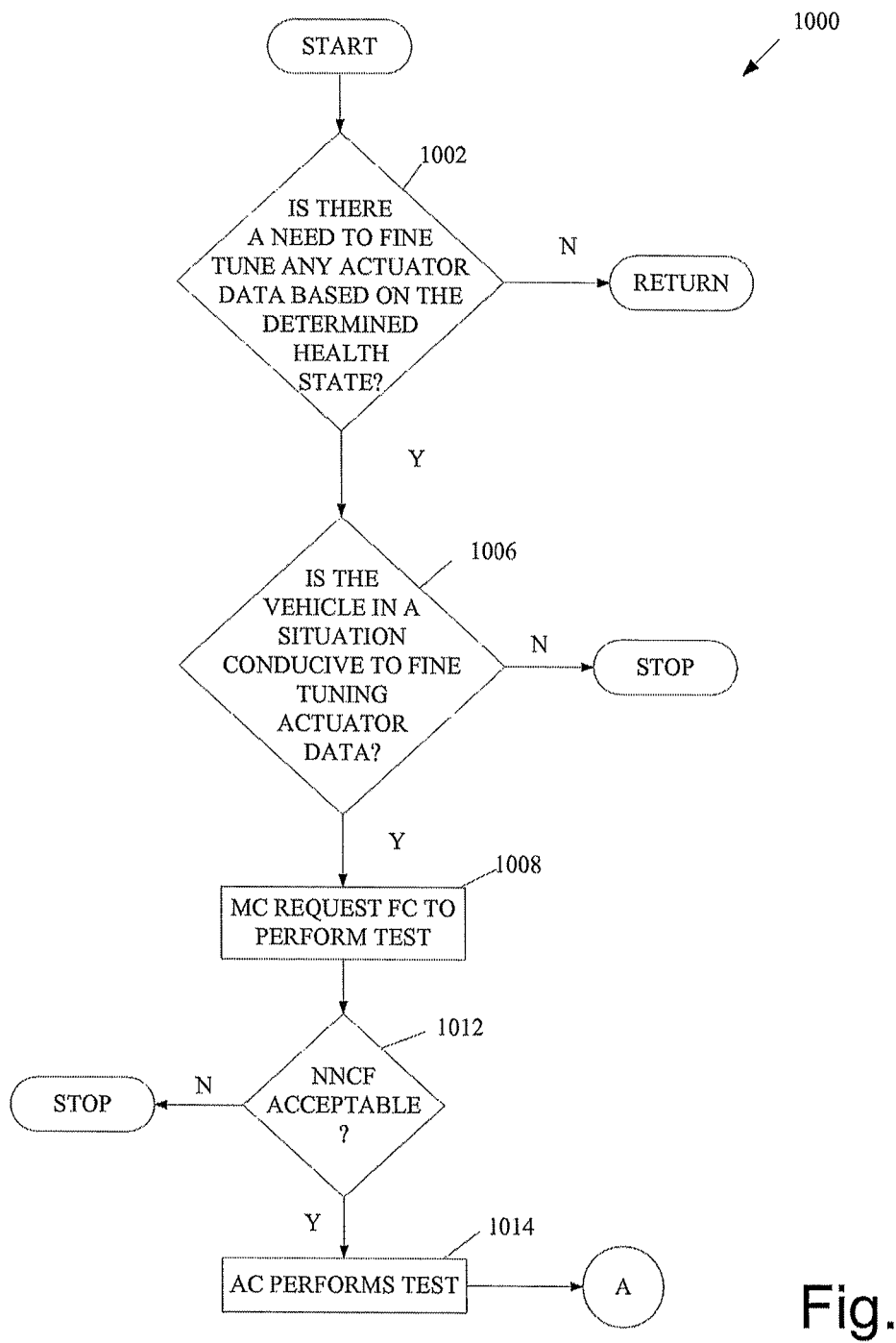

FIG. 10 illustrates a fine tuning process 1000 performed at the block 848 of FIG. 8B. In this embodiment, at block 1002, the MC system 604 determines if there is a need to fine tune any actuator data based on the determined actuator health state. If fine tuning of the actuator data is not necessary, the fine tuning process 1000 is returned to block 860 of FIG. 8B. If fine tuning is determined to be necessary, then at block 1006, the MC system 604 determines if the vehicle 602 is in a phase of a mission conducive to fine tuning an actuator 610. Examples of phases of a mission include a low observable mode, where an aircraft maintaining its present attitude is vitally important for keeping its radar cross-section at a minimum, or where an aircraft is in a high-G or terrain-following situation or other flight maneuver that is not conducive to reconfiguring actuators. If it is determined at block 1006 that the mission phase is not conducive, the fine tuning process 1000 is stopped.

If the mission phase does allow for fine tuning of the actuator data, then at block 1008, the MC system 604 requests the FC system 606 to perform the fine tuning test of an associated actuator. Before the test is performed, the FC system 606 determines if the adaptive control correction factor is acceptable at block 1012. If the correction factor is not acceptable, the fine tuning process 1000 is stopped. If the factor is acceptable, the AC component 612 performs the test/fine tuning at block 1014, and the fine tuning process 1000 returns to the beginning of the process 820. An example of the test/fine tuning is an Actuator Test Injection, described more fully below.

During an Actuator Test Injection of a fine tuning test, the AC component 612 inserts test signals as commands to an actuator, while compensating with the remaining actuators. There are at least two uses for this. First, a suspect actuator can be exercised to confirm its health. If a control surface is commanded to sweep its range of motion and fails to do so, the FC system 606 confirms the performance failure, and then the AC component 612 is notified to permanently reconfigure. When the FC system 606 declares a complete actuator failure, control is reconfigured to remove reliance on that actuator 610. Safety, redundancy, and handling may be negatively impacted. Before the FC system 606 declares an actuator failed, confirmation via test injection is performed.

Second, the inserted test signals are developed using specific actuator loads and command sequences, such as low load with low frequency sine waves, or swept frequency sine waves with no load. Accuracy and/or confidence are significantly increased by duplicating laboratory test conditions during field use.

As described above, the FC system 606 may perform PID testing. The PID testing determines vehicle expected response to each control actuator. The expected response is then compared to actual performance via a dedicated on-board vehicle model, and any divergence is attributed to a specific control surface. Output is a vector representing each control surface, and each element is characterized as nominal, degraded, or failed. To isolate control variance to a specific surface, commands to each surface/actuator are distinct. In one embodiment, artificial excitation (i.e., a very small sinusoidal signal) is added to a position command for each actuator 610, with each at a distinct frequency. In another embodiment, PID is performed only when the surfaces happen to have distinct commands, a sort of "natural excitation". PID assessment becomes opportunity driven in this case. The opportunity to test is enhanced by an interface that would make vehicle mission control element aware of the potential benefit of this testing.

When the FC system 606 has reached a valid conclusion that capability is reduced, the AC component 612 may perform a gradual change in the signals sent to a reduced performance actuator (i.e., a ramp from one state to another state versus an abrupt state change). The process 820 is re-executed after every performed gradual change. This allows identification of whether the information is improving or degrading control capability, and confirms that the information sent to the reduced performance actuator is accurate and useful Improvements may be measured by the FC system 606, by the AC component 612, or by both.

Various modules and techniques have been described in the general context of computer-executable instructions, such as program modules, executed by one or more computers or other devices. Generally, program modules include routines, programs, objects, components, data structures, and so forth for performing particular tasks. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may also be stored on or transmitted across some form of computer readable media.

Although vehicle health management systems and methods have been described in language specific to certain features and methods, it is to be understood that the features defined in the appended claims are not necessarily limited to the specific features and methods described. Rather, the specific features and methods disclosed are illustrative forms of implementing the claimed subject matter.

What is claimed is:

1. A method comprising:
   receiving first vehicle data from a sensor on a vehicle at one or more processors executing a first software module;
   determining, by the first software module, one or more of a risk value associated with the first vehicle data, a confidence value associated with whether the first vehicle data matches a validated vehicle state, or a benefit value associated with providing the first vehicle data to a second software module comprising an evaluator and a filter;
   calculating, by the evaluator, a health score associated with the first vehicle data based on the risk value, the confidence value, and the benefit value;
   transferring the first vehicle data to the filter in response to the health score meeting a threshold value;
   determining, by the filter, whether the first vehicle data is internally consistent;
   determining, by the filter, whether the first vehicle data is externally consistent with second vehicle data from the sensor;

determining, by the filter, whether the first vehicle data is stable over time; and providing the first vehicle data to a vehicle flight control system in response to determining that the first vehicle data is internally consistent, externally consistent, and stable over time.

2. The method of claim 1, wherein the risk value includes a first value associated with a risk resulting from an actuator failure relative to a control surface that affects a position of the vehicle.

3. The method of claim 1, wherein the confidence value is determined by comparing a current state of the vehicle with a state of the vehicle when the first software module is tested.

4. The method of claim 1, wherein determining whether the first vehicle data is externally consistent with the second vehicle data comprises:

receiving the second vehicle data from the sensor, wherein the first vehicle data has a higher fidelity than the second vehicle data; and comparing the first vehicle data and the second vehicle data, wherein the first vehicle data is externally consistent if the first vehicle data corresponds to the second vehicle data.

5. The method of claim 1, wherein the first vehicle data indicates a position of an actuator, and wherein the second vehicle data includes an error message if the actuator is in an unexpected position.

6. The method of claim 1, wherein determining whether the first vehicle data is internally consistent comprises determining whether particular data fields of the first vehicle data are populated, wherein the first vehicle data is internally consistent if the particular data fields are populated.

7. The method of claim 6, further comprising modifying a vehicle flight control algorithm of the vehicle flight control system based on the first vehicle data.

8. The method of claim 1, further comprising verifying vehicle state information by performing a parameter identification test, the parameter identification test including:

adjusting an actuator command;

capturing actual vehicle response data;

comparing the actual vehicle response data to expected vehicle response data as predicted by a vehicle model; and providing a correction to the vehicle flight control system based on a result from performing the parameter identification test.

9. A non-transitory computer-readable medium comprising instructions which, when executed by one or more processors, cause the one or more processors to perform operations including:

receiving first vehicle data from a sensor on a vehicle at a first software module executable by the one or more processors;

determining one or more of a risk value associated with the first vehicle data, a confidence value associated with whether the first vehicle data matches a validated vehicle state, or a benefit value associated with providing the first vehicle data to a second software module comprising an evaluator and a filter;

calculating, by the evaluator, a health score associated with the first vehicle data based on the risk value, the confidence value, and the benefit value;

transferring the first vehicle data to the filter in response to the health score meeting a threshold value;

determining, by the filter, whether the first vehicle data is internally consistent;

determining, by the filter, whether the first vehicle data is externally consistent with second vehicle data from the sensor;

determining, by the filter, whether the first vehicle data is stable over time; and providing the first vehicle data to a vehicle flight control system in response to determining that the first vehicle data is internally consistent, externally consistent, and stable over time.

10. The non-transitory computer-readable medium of claim 9, wherein the risk value includes a first value associated with a risk resulting from an actuator failure.

11. The non-transitory computer-readable medium of claim 9, wherein the confidence value is determined by comparing a current state of the vehicle with a state of the vehicle when the first software module is tested.

12. The non-transitory computer-readable medium of claim 9, wherein determining whether the first vehicle data is stable over time comprises comparing the first vehicle data to a rate of change threshold, wherein the first vehicle data is stable over time if the first vehicle data is less than or equal to the rate of change threshold.

13. The non-transitory computer-readable medium of claim 12, wherein the first vehicle data corresponds to data regarding an actuator of the vehicle, and wherein the second vehicle data corresponds to second data regarding an actuator of the vehicle.

14. A system comprising:

one or more processors;

a memory comprising instructions which, when executed by the one or more processors, cause the one or more processors to perform operations including:

receiving first vehicle data from a sensor on a vehicle at one or more processors executing a first software module;

determining one or more of a risk value associated with the first vehicle data by the one or more processors, a confidence value associated with whether the first vehicle data matches a validated vehicle state by the one or more processors, or a benefit value associated with providing the first vehicle data to a second software module comprising an evaluator and a filter;

calculating, by the evaluator, a health score associated with the first vehicle data based on the risk value, the confidence value, and the benefit value;

transferring the first vehicle data to the filter in response to the health score meeting a threshold value;

determining, by the filter, whether the first vehicle data is internally consistent;

determining, by the filter, whether the first vehicle data is externally consistent with second vehicle data from the sensor;

determining, by the filter, whether the first vehicle data is stable over time; and providing the first vehicle data to a vehicle flight control system in response to determining that the first vehicle data is internally consistent, externally consistent, and stable over time.

15. The system of claim 14, wherein the risk value includes a first value associated with a risk resulting from an actuator failure.

16. The system of claim 14, wherein the confidence value is determined by comparing a current state of the vehicle with a state of the vehicle when the first software module is tested.

17. The system of claim 14, wherein the first vehicle data is high fidelity data from the sensor, and wherein the second vehicle data is low fidelity data from the sensor.

18. The method of claim 1, further comprising, in response to determining that the first vehicle data is not externally consistent with the second vehicle data, filtering, by the filter, the first vehicle data to remove external inconsistencies based on the second vehicle data.

19. The method of claim 1, further comprising conditionally filtering, by the filter, the first vehicle data based on whether the first vehicle data is internally consistent, whether the first vehicle data is externally consistent, and whether the first vehicle data is stable over time.

20. The method of claim 1, further comprising verifying vehicle state information by performing a neural net correction test, the neural net correction test including providing correction factors to the vehicle flight control system to compensate for unexpected vehicle responses.

\* \* \* \* \*